(12) United States Patent
Lechat et al.

(10) Patent No.: US 11,059,354 B2
(45) Date of Patent: Jul. 13, 2021

(54) AIR COOLING DEVICE FOR A VEHICLE AND ASSOCIATED HEATING, VENTILATION AND/OR AIR CONDITIONING INSTALLATION

(71) Applicant: Valeo Systemes Thermiques, Le Mesnil Saint Denis (FR)

(72) Inventors: Yvan Lechat, Le Mesnil Saint Denis (FR); Vincent Feuillard, Le Mesnil Saint Denis (FR); Franck Truillet, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 150 days.

(21) Appl. No.: 16/094,430

(22) PCT Filed: Apr. 6, 2017

(86) PCT No.: PCT/FR2017/050822
§ 371 (c)(1),
(2) Date: Mar. 5, 2019

(87) PCT Pub. No.: WO2017/182729
PCT Pub. Date: Oct. 26, 2017

(65) Prior Publication Data
US 2019/0193529 A1    Jun. 27, 2019

(30) Foreign Application Priority Data

Apr. 18, 2016 (FR) ........................................ 1653415

(51) Int. Cl.
*B60H 3/02* (2006.01)
*B05B 1/30* (2006.01)
(Continued)

(52) U.S. Cl.
CPC ............... *B60H 3/022* (2013.01); *B05B 1/30* (2013.01); *B05B 1/3013* (2013.01);
(Continued)

(58) Field of Classification Search
CPC .. B60H 3/022; B60H 1/247; B60H 2003/026; B05B 1/30; B05B 1/3013; B05B 7/0012;
(Continued)

(56) References Cited

U.S. PATENT DOCUMENTS 4,418,672 A * 12/1983 Muller .................. F01N 13/008
123/472

FOREIGN PATENT DOCUMENTS

FR        3001526 A1    8/2014
JP       S61-181718 A   8/1986
(Continued)

OTHER PUBLICATIONS

International Search Report issued in International Application No. PCT/FR2017/050822, dated Jun. 27, 2017 (3 pages).
(Continued)

*Primary Examiner* — Christopher S Kim
(74) *Attorney, Agent, or Firm* — Osha Bergman Watanabe & Burton LLP

(57) ABSTRACT

The invention relates to an air cooling device (1) for a vehicle, notably a motor vehicle, comprising:—at least a reserve (3) of liquid,—a device (5) for nebulizing the liquid, —at least two air outlets (7) for diffusing at least an air flow (F1, F2) intended for the interior of the said vehicle, and—at least two nebulizing ducts (9) respectively intended to have passing through them an air flow (F1) laden with droplets of nebulized liquid, each nebulizing duct (9) being arranged in fluidic communication with the reserve (3) of liquid and with an associated air outlet (7). According to the invention, the air cooling device (1) comprises at least one nebulizing
(Continued)

regulating member (19) to regulate the flow rate of the air flow (F1) laden with droplets of nebulized liquid passing along a nebulizing duct (9) and to be diffused through the air outlet (7) associated with this nebulizing duct (9).

10 Claims, 3 Drawing Sheets

(51) Int. Cl.
*B05B 7/00* (2006.01)
*B05B 17/06* (2006.01)
*B60H 1/24* (2006.01)
*B05B 7/06* (2006.01)

(52) U.S. Cl.
CPC .......... *B05B 7/0012* (2013.01); *B05B 7/0075* (2013.01); *B05B 7/0081* (2013.01); *B05B 7/06* (2013.01); *B05B 17/0615* (2013.01); *B60H 1/247* (2013.01); *B60H 2003/026* (2013.01)

(58) Field of Classification Search
CPC ....... B05B 7/0075; B05B 7/0081; B05B 7/06; B05B 17/0615
USPC ..... 239/102.2, 443, 444, 446, 447, 338, 340
See application file for complete search history.

(56) References Cited

FOREIGN PATENT DOCUMENTS

| JP | H06115347 A | 4/1994 |
| JP | H0995127 A | 4/1997 |
| JP | 2009-286244 A | 12/2009 |

OTHER PUBLICATIONS

Written Opinion issued in International Application No. PCT/FR2017/050822, dated Jun. 27, 2017 (5 pages).

\* cited by examiner

AIR COOLING DEVICE FOR A VEHICLE AND ASSOCIATED HEATING, VENTILATION AND/OR AIR CONDITIONING INSTALLATION

The invention relates to an air cooling device for a motor vehicle. The invention also relates to a heating, ventilation and/or air conditioning installation comprising such an air cooling device.

In order to ensure the thermal comfort of the passengers of a vehicle, for example, motor vehicles generally include a ventilation and/or air conditioning installation allowing a temperature to be established in the interior that is below the outside temperature.

These ventilation and/or air conditioning installations ventilate cooled air in such a way as to provide thermal comfort for the occupants of the vehicle. A first disadvantage of such installations is that the cooled air is dried. Furthermore, the seats located in the rear of the interior are often less well ventilated, such that they are also less well cooled. It is also to be noted that not all vehicles are necessarily provided with an air conditioner.

In order to improve the situation, nebulizing a liquid such as water is known. To this end, a known solution is to provide an air cooling device particularly comprising a diffuser, through which an air flow circulates, and a device for nebulizing a liquid generating droplets with a view to mixing them with the air flow intended to be sent to the interior of the vehicle.

Nebulizing devices with piezoelectric systems are particularly known, for example, having nebulizing heads with a micro-perforated membrane, or devices using the "acoustic fountain" principle that is based on the behavior of a nebulizing liquid subjected to an acoustic field.

Delivering droplets through a diffuser allows the moisture content of the air present inside the interior to be increased and also allows the temperature of this air to be decreased. Indeed, the droplets of nebulized liquid, by evaporating, cause a reduction in temperature due to the latent vaporization heat, which is then absorbed. This manifests itself to the one or more passenger(s) in the vehicle, for example, only through the fresh feeling that they experience, without perceiving an increase in moisture content.

Such a solution allows the lack of an air conditioner to be at least partially overcome or allows the cooling of the interior to be improved when such an air conditioner is present, yet is inadequate locally. This solution also helps to humidify the air.

According to some known solutions, two air flows are necessary, namely the air flow that is set into motion in order to be distributed inside the interior of the vehicle, with which air flow another air flow laden with droplets of nebulized liquid is mixed. It is the mixing of these two air flows that then allows, once it is distributed inside the interior, the moisture content of the air contained in the interior to be increased and thus allows the occupants of the vehicle to be provided with the cooling sensation.

Furthermore, it is known for various diffusers to be disposed in the vehicles, particularly in the front, or in the vicinity of the rear passengers, whether in the vicinity of the side pillars between doors or even in the vicinity of the central console or sometimes the roof. Managing the air flow rates and temperatures for each diffuser allows comfortable local conditions to be provided for each passenger.

However, the known air cooling devices with liquid nebulizing do not allow independent adjustment of the volume of nebulized liquid for each passenger.

Therefore, the aim of the invention is to at least partially overcome these problems of the prior art by proposing a simple alternative of an air cooling device allowing nebulization to be provided with a volume of nebulized liquid that can be adjusted for each of the air outlets connected to a diffuser in the interior, as a function of the requirements of the vehicle occupants.

To this end, the aim of the invention is an air cooling device for a vehicle, particularly for a motor vehicle, comprising at least one liquid reserve, at least one device for nebulizing the liquid in the form of droplets, at least two air outlets respectively configured for diffusing at least one air flow intended for the interior of said vehicle, and at least two nebulizing pipes respectively intended to be traversed by an air flow laden with droplets of nebulized liquid, each nebulizing pipe being arranged in fluidic communication with the liquid reserve and with an associated air outlet.

According to the invention, the air cooling device further comprises at least one nebulizing regulating member configured to regulate the flow rate of the air flow laden with droplets of nebulized liquid intended to pass through a nebulizing pipe and to be diffused through the air outlet associated with this nebulizing pipe.

This enables adjustment of the volume of the air flow laden with droplets of liquid intended for each air outlet.

The air cooling device according to the invention can further comprise one or more of the following features, taken individually or in combination:
- the nebulizing regulating member is arranged downstream of the nebulizing device in the flow direction of the air flow laden with droplets of nebulized liquid;
- the nebulizing regulating member is produced in the form of a distribution flap;
- the air cooling device comprises at least one distribution flap arranged in an associated nebulizing pipe, so as to move between at least one closed position blocking the air flow and a plurality of positions, called open positions, allowing adjustment of the flow rate of the air flow laden with droplets of nebulized liquid intended for a respective associated air outlet;
- at least one distribution flap is arranged in each nebulizing pipe, the distribution flaps being respectively configured to independently regulate the flow rate of the air flow laden with droplets of nebulized liquid for each nebulizing pipe;
- at least one distribution flap is arranged at the junction of two nebulizing pipes, so as to move between two end positions for closure of either one of the nebulizing pipes, so as to distribute the air flow intended to be laden with droplets of nebulized liquid intended for each air outlet associated with a nebulizing pipe;
- the air cooling device comprises at least two first pipes forming the nebulizing pipes intended to be traversed by a first air flow, and at least two second pipes respectively intended to be traversed by a second air flow distinct from the first air flow, each second pipe being associated with a first respective pipe and being arranged in fluidic communication with a respective air outlet;
- each first pipe is at least partially disposed inside an associated second pipe;
- the air cooling device comprises a sealed separation partition arranged between two second pipes;
- the first air flow and the second air flow are intended to be set into motion by a common air propulsion component of the air cooling device or of a heating, ventilation and/or air conditioning installation configured to equip said vehicle;

the first air flow and the second air flow are intended to be set into motion by distinct and independent air propulsion components, each propulsion component belonging to the air cooling device or to a heating, ventilation and/or air conditioning installation configured to equip said vehicle; in particular, the second air flow is intended to be set into motion by an air propulsion component of the cooling device and the first air flow is intended to be set into motion by a distinct air propulsion component belonging to a heating, ventilation and/or air conditioning installation configured to equip said vehicle;

the air cooling device comprises at least one air distribution flap movably arranged so as to distribute the air flow rate between the first air flow and the second air flow;

at least two air distribution flaps are arranged on either side of the separation partition, said flaps being respectively configured to distribute, for an associated air outlet, the first air flow and the second air flow intended to circulate in the first and second pipes associated with the air outlet;

the air cooling device comprises an air flow feed canal, the feed canal having a first branch dividing into at least two first pipes and a second branch dividing into at least two second pipes;

the air distribution flap is arranged between the first branch and the second branch of the feed canal, so as to distribute the first air flow intended for the first pipes via the first branch and the second air flow intended for the second pipes via the second branch;

the air cooling device comprises an additional air distribution flap movably arranged at the junction between the two second pipes between two end positions for closure of either one of the second pipes, so as to distribute the second air flow circulating in the second branch between the second pipes respectively associated with a distinct air outlet.

The invention also relates to a heating, ventilation and/or air conditioning installation comprising a cooling device as previously defined.

Further features and advantages of the invention will become more clearly apparent upon reading the following description, which is provided by way of a non-limiting illustration, and with reference to the accompanying drawings, in which.

Throughout the description, identical elements are identified using the same reference signs.

The following embodiments are examples. Even though the description refers to one or more embodiments, this does not necessarily mean that each reference relates to the same embodiment or that the features are only applicable to a single embodiment. Simple features of various embodiments also can be combined or interchanged in order to provide other embodiments.

Throughout the description, some elements can be indexed, such as, for example, first element or second element. In this case, it involves simple indexing for differentiating and designating similar but non-identical elements. This indexing does not imply priority of one element over another element and such designations can be easily interchanged without departing from the scope of the present description. This indexing also does not imply a time order.

With reference to FIGS. 1 to 5, the invention relates to a device 1 for cooling an air flow for a motor vehicle, allowing the air contained inside an interior of a motor vehicle to be cooled. The cooling device 1 is intended to increase the moisture content of the air present inside the interior and also to decrease the temperature of the air. To this end, the cooling device 1 is configured to nebulize a liquid, called nebulizing liquid, and to distribute micro-droplets or droplets of nebulized liquid toward the interior.

To this end, as can be more clearly seen in FIGS. 2a, 2b, 4a to 4c and 5, the cooling device 1 comprises at least one reserve 3 of liquid, called nebulizing liquid, such as water or the like, and at least one device 5 for nebulizing droplets from the nebulizing liquid.

The nebulizing device 5 is, for example, a piezoelectric system that is able to cause an upper surface of the liquid to vibrate, which surface is the surface in contact with the air, in order to generate such droplets. To this end, the nebulizing device 5 comprises at least one piezoelectric transducer (not shown) that is configured to generate acoustic waves, particularly ultrasonic waves. This technology, also called "acoustic fountain", is based on focusing an acoustic wave on the surface of a liquid. If the acoustic intensity is sufficient, an acoustic fountain forms, on the surface of which a cloud of droplets develops. Reference is also made to an ultrasound nebulizing device. The nebulizing device 5 may or may not be immersed in the nebulizing liquid contained in the reserve 3. Of course, other alternatives of a nebulizing device can be contemplated.

The cooling device 1 further comprises a plurality of air outlets 7, particularly at least two air outlets 7, respectively configured to diffuse at least one air flow, preferably intended for a different zone or part of the interior of the vehicle.

Figure 1:
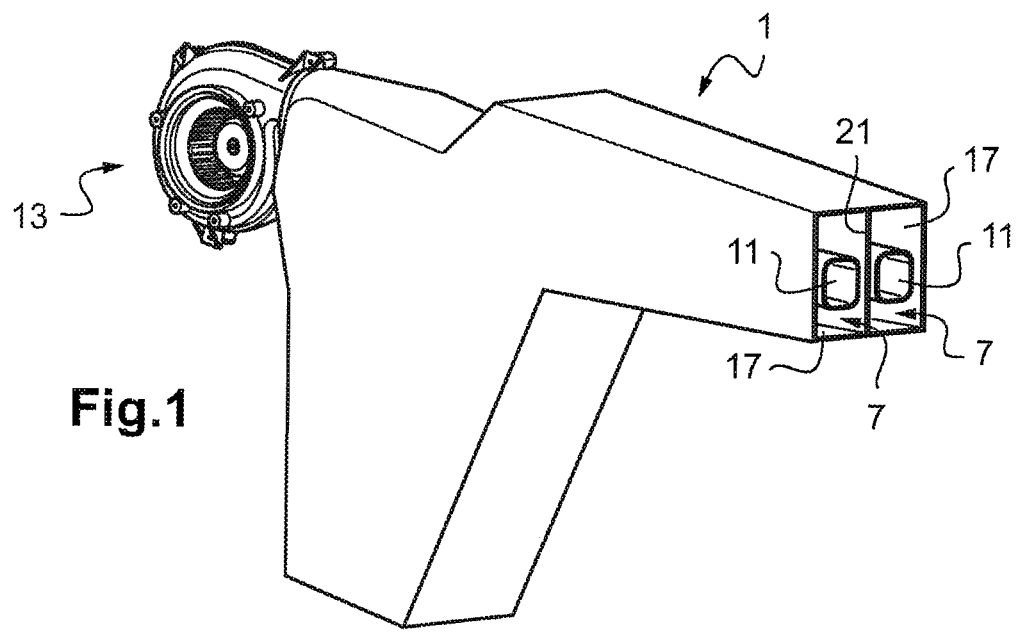
FIG. 1 is a perspective view of a cooling device according to a first embodiment.
Figure 3:
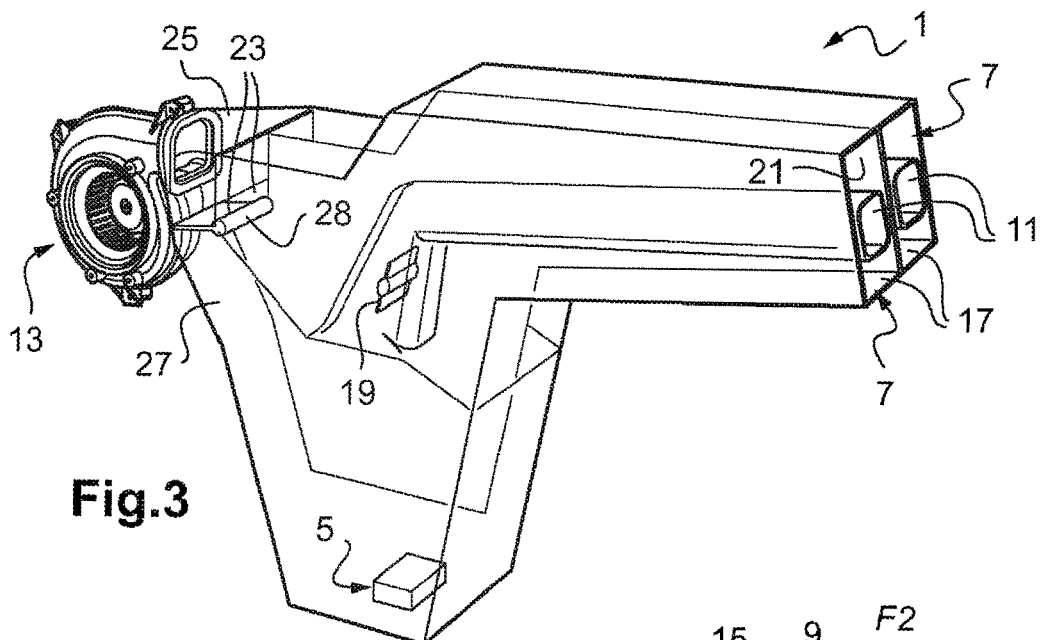
FIG. 3 is a perspective view of a cooling device according to a second embodiment.
Figure 5:
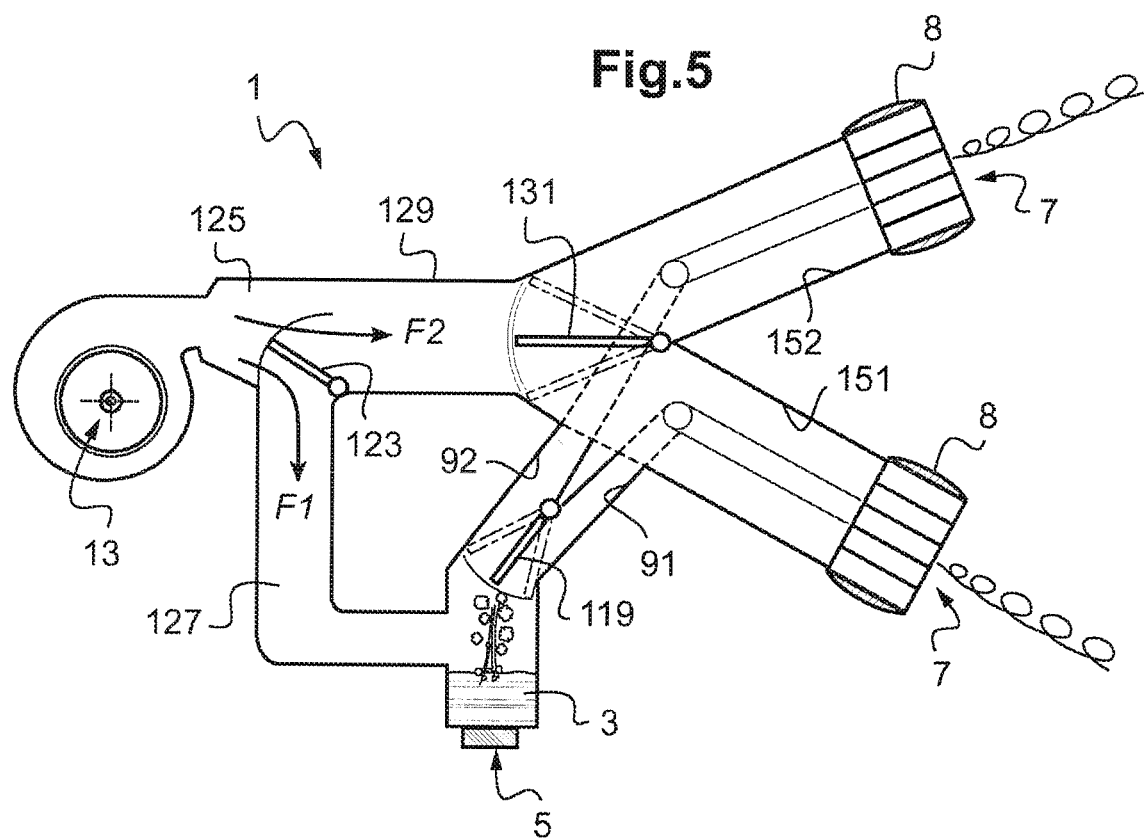
FIG. 5 is a perspective view of a cooling device according to a third embodiment.

In the example shown in FIGS. 1, 3 and 5, the cooling device 1 comprises two air outlets 7. Each air outlet 7 of the cooling device 1 is in aeraulic communication with a diffuser 8 (not shown in FIGS. 1 and 3). Two diffusers 8 are schematically shown in FIG. 5. A diffuser 8 equally can be integrated in a front console of a dashboard of the motor vehicle or in a central console interposed between the seats of the motor vehicle or in any other structural element contained inside the interior of the motor vehicle. Preferably, the various diffusers 8 are arranged at distinct points of the interior. This allows the cooling of the air to be separated according to the relevant zone of the interior in which a diffuser 8 is arranged, for example, the left-hand/right-hand and/or rear/front zones. In order to diffuse the one or more air flow(s) in the interior of the vehicle, each diffuser 8 has at least one opening (not shown in the figures). This opening can receive an at least partially vented element, such as a ventilation grille (not shown).

Figure 2A:
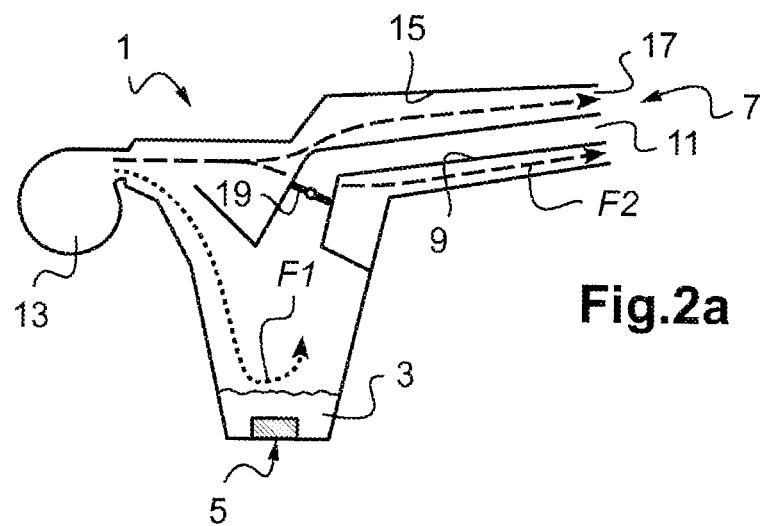
FIG. 2a is a first section view of the cooling device of FIG. 1 showing a distribution flap in a closed position in a nebulizing pipe.
Figure 2B:
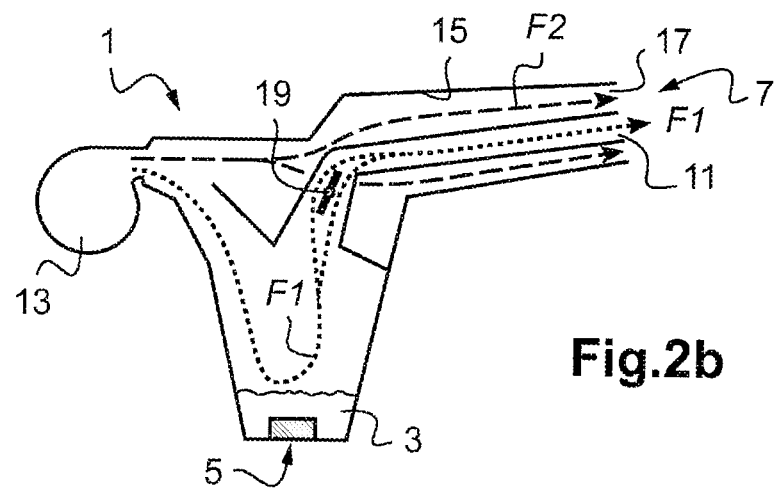
FIG. 2b is a second section view of the cooling device of FIG. 1 showing the distribution flap in an open position.
Figure 4A:
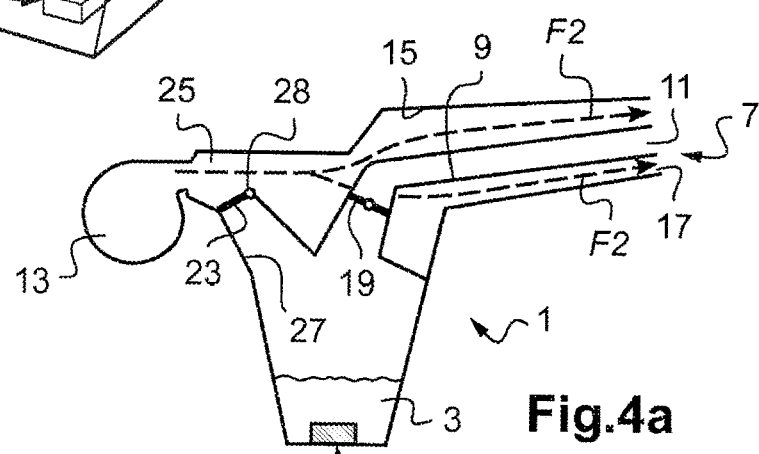
FIG. 4a is a first section view of the cooling device of FIG. 3 showing a distribution flap in a closed position in a nebulizing pipe and an air distribution flap in an end position blocking the passage of the air flow toward the nebulizing pipe.
Figure 4B:
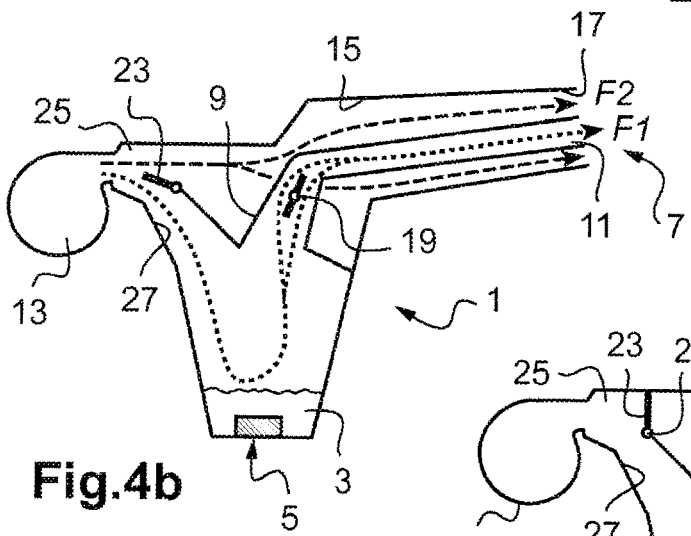
FIG. 4b is a second section view of the cooling device of FIG. 3 showing the distribution flap in an open position and the air distribution flap in an intermediate position.

Furthermore, with reference to FIGS. 2*b*, 4*b* and 5, at least one first air flow F1 is intended to be laden with droplets of nebulized liquid before being distributed inside the interior. The droplets of nebulized liquid are therefore mixed with the first air flow F1 intended for the interior, so as to form a mist that will be distributed inside the interior. When the first air flow F1 is laden with droplets of nebulized liquid, it is also referred to as nebulizing flow F1.

To this end, the air cooling device 1 comprises at least one first pipe 9 (FIGS. 1 to 4*c*); 91, 92 (FIG. 5), called nebulizing pipe, arranged in fluidic communication with the reserve 3 and an associated air outlet 7, and intended to be traversed by the first air flow F1 laden with droplets of nebulized liquid.

In particular, the air cooling device 1 comprises at least one first pipe 9; 91, 92 for each air outlet 7. With reference to FIGS. 1, 3 and 5, the cooling device 1 comprises two nebulizing pipes 9 or 91 and 92. As schematically shown in FIGS. 2*b*, 4*b* and 5, each nebulizing pipe 9; 91, 92 is respectively intended to be traversed by an air flow F1 that is laden with droplets of nebulized liquid. To this end, each nebulizing pipe 9; 91, 92 is arranged in fluidic communication with the liquid reserve 3 and an associated air outlet 7.

As schematically shown in FIGS. 2*a* to 2*b*, 4*a* to 4*c* and 5, the nebulizing liquid reserve 3 can be arranged so as to allow an upward flow of the first air flow F1 between the reserve 3 and an associated air outlet 7. The reserve 3 is thus connected to one or to each first pipe 9; 91, 92, which preferably overhang the reserve 3. In other words, the one or each first pipe 9; 91, 92 at least partly extends above the reserve 3, in a vertical direction, with reference to the arrangement of the elements in FIGS. 1 to 5, generally corresponding to the arrangement once mounted in the motor vehicle. Provision can be made for a single reserve 3 and a single nebulizing device 5 for all the air outlets 7 or, by way of a variation, a plurality of reserves 3 and of nebulizing devices 5.

Furthermore, as is more clearly shown in FIGS. 1 to 4*c*, each first pipe 9; 91, 92 ends with a mouth 11 configured to be in aeraulic communication with at least one first distribution opening of the diffuser 8 (not shown in FIGS. 1 to 4*c*) opening into the interior. The first air flow F1 laden with droplets of nebulized liquid thus can be discharged through the first distribution opening of the diffuser 8, so as to allow re-humidification of the air contained in the interior of the vehicle. By way of a non-limiting example, the diameter of the mouth 11 of the first pipe 9 can be approximately 10 to 25 mm.

Furthermore, an air propulsion component 13 allows the first air flow F1 to be set into motion.

According to a variation, the air cooling device 1 can comprise its own propulsion component 13, such as a fan, commonly called blower, allowing the first air flow F1 to be set into motion. According to this variation, the common air propulsion component 13 thus forms part of the cooling device 1.

Alternatively, the air cooling device 1 is, for example, connected to a ventilation network of an existing heating, ventilation and/or air conditioning installation in the motor vehicle. in this case, the air propulsion component allowing the first air flow F1 to be set into motion is an air propulsion component, such as the motor-fan unit of the heating, ventilation and/or air conditioning installation equipping the vehicle.

The air cooling device 1 also can comprise, for each air outlet 7, a second pipe 15; 151, 152 in aeraulic communication with the associated air outlet 7 and intended to be traversed by a second air flow F2 intended for the interior. This second air flow F2, also called main air flow, is distinct from the first air flow F1.

According to the example shown in FIGS. 1, 3 and 5, the cooling device 1 comprises two second pipes 15 or 151 and 152. Each second pipe 15; 151, 152 is associated with a first respective pipe 9; 91, 92 and is arranged in fluidic communication with a respective air outlet 7.

As is more clearly shown in FIGS. 1 to 4*c*, each second pipe 15; 151, 152 ends with a mouth 17 intended to be in aeraulic communication with at least one second distribution opening of the diffuser 8 (not shown in FIGS. 1 to 4*c*), through which the second air flow F2 passes in order to discharge inside the interior. By way of a non-limiting example, the diameter of the mouth 17 of the second pipe 15; 151, 152 can be approximately 60 mm.

Preferably, each first pipe 9; 91, 92 at least partially extends inside a second associated pipe 15; 151, 152, particularly at the center thereof. Each mouth 11 of a first pipe 9; 91, 92 is then surrounded by the mouth 17 of the associated second pipe 15; 151, 152 and is particularly arranged at the center thereof. Each first pipe 9; 91, 92 thus isolates the first air flow F1 from the second air flow F2, and these flows are only mixed after they have passed through the associated air outlet 7. In other words, the air flows F1 and F2 are mixed at the outlet of the air cooling device 1, in order to increase the moisture content of the air present inside the interior and to decrease the temperature of this air. Such a configuration is advantageous in terms of the comfort perceived by the user. Indeed, it has been noted that if the air flows F1 and F2 pass through a common pipe before being distributed inside the interior, the result is a phenomenon involving condensation of the droplets of nebulized liquid on the inner walls of the common pipe. Condensed water generates a risk of the proliferation of bacteria and even algae in the pipe and/or of bad smells, which can adversely affect the comfort of the occupants in the interior of the vehicle, for example, and which can require the implementation of purification of the air flow. Mixing the first air flow F1 laden with droplets of nebulized liquid with the second air flow F2, also called main air flow, downstream of the one or of each air outlet 7 in the flow direction of the air flow allows such condensation to be avoided.

Furthermore, an air propulsion component 13 allows the second air flow F2 to be set into motion.

Advantageously, the first air flow F1 and the second air flow F2 are intended to be set into motion by a common air propulsion component 13. In other words, a single propulsion component 13 sets an air flow into motion, which air flow is subsequently separated in order to form the first air flow F1 and the second air flow F2. By using a single propulsion component 13 or blower to set into motion the first air flow F1 and the second main air flow F2 intended for the interior, a smaller air cooling device 1 is obtained. Furthermore, starting a single propulsion component 13 allows electrical consumption to be reduced.

According to a variation, the air cooling device 1 can comprise its own propulsion component, such as a fan, commonly called blower, allowing the air flow to be set into motion that is intended to be distributed between the first air flow F1 and the second air flow F2. According to this variation, the common air propulsion component 13 thus forms part of the cooling device 1.

Alternatively, the air cooling device 1 is, for example, connected to a ventilation network of an existing heating, ventilation and/or air conditioning installation in the motor vehicle. In this case, the air propulsion component 13 is an air propulsion component, such as the motor-fan unit of the heating, ventilation and/or air conditioning installation with which the vehicle is equipped.

According to one embodiment, not shown, the first air flow F1 and the second air flow F2 can be intended to be set into motion by distinct air propulsion components. Each propulsion component can belong to the air cooling device or to the heating, ventilation and/or air conditioning installation configured to equip the vehicle. By way of an example, the second air flow F2 can be intended to be set into motion by the propulsion component 13 forming part of the air cooling device 1, whereas the first air flow F1 can be intended to be set into motion by a propulsion component (not shown) that is distinct from and independent of the propulsion component 13. The air propulsion component that allows the first air flow F1 to be set into motion can be, for example, an air propulsion component such as the motor-fan unit of the heating, ventilation and/or air conditioning installation with which the vehicle is equipped.

Advantageously, the air cooling device 1 further comprises at least one nebulizing regulating member 19 (FIGS. 1 to 4c), 119 (FIG. 5) configured to regulate the flow rate of the first air flow F1 intended to pass through a nebulizing pipe 15 associated with an air outlet 7 and intended to be diffused through the associated air outlet 7. This allows the nebulization to be managed differently, for example, in the right-hand or left-hand side and/or in the front or rear zone of the interior of the vehicle. Thus, depending on the zone of the interior in which they are located, an occupant of the vehicle can adapt the flow rate of the nebulizing flow F1 to their requirements.

According to the examples shown in FIGS. 1 to 5, the one or more nebulizing regulating member(s) 119; 119 are arranged downstream of the nebulizing device 5 in the flow direction of the first air flow F1. This allows the flow rate of the first air flow F1 to be regulated once it is laden with droplets of nebulized liquid.

The member or each nebulizing regulating member 19; 119 is, for example, produced in the form of a distribution flap 19; 119. The one or more distribution flap(s) 19; 119 can be of any type, for example, of the flag, drum or even butterfly type.

Each distribution flap 19; 119 can be manually moved under the action of a user, for example, using a button provided in the interior. In particular, the position of the distribution flap 19; 119 is determined as a function of the flow rate of the nebulized liquid requested by the user. Managing the positioning of each flap 19; 119 allows the nebulizing flow to be adapted, for example, in the right-hand or left-hand side of the interior of the vehicle, as a function of factors influencing the thermal comfort of the occupants, such as, for example, direct exposure to the sun on only one side of the interior.

By way of an alternative or in addition, the air cooling device 1 can comprise at least one actuator (not shown), more specifically an electric actuator, configured to control the movement of the distribution flap 19; 119 in an at least partially automatic manner. Of course, the possibility of manual and automatic control of the position of the distribution flap 19; 119 can be combined.

In order to automate the control of the position of the distribution flaps 19; 119, the air cooling device 1 can comprise at least one device (not shown) for controlling the actuator, comprising at least one processing means for determining the arrangement of each distribution flap 19; 119 as a function of thermal and/or climate conditions. Thermal conditions are understood to be parameters influencing the thermal comfort perceived by one or more occupant(s) of the interior of the vehicle. By way of a non-limiting example, it can involve temperature data for the inside of the interior and/or even a moisture content level inside the interior, or any other element or parameter providing information with respect to the thermal environment of the interior of the vehicle. Similarly, climate conditions or climatic conditions are understood to be parameters that can influence the comfort perceived by the one or more occupant(s) inside the vehicle, such as sunshine or solar flux, which, by radiating through a window of the vehicle, can increase the thermal discomfort of an occupant.

In this case, at least one processing means can detect a thermal discomfort factor and consequently determine the position to be adopted by the one or by each distribution flap 19; 119, and control the actuator so that it moves the one or each distribution flap 19; 119 to the determined position.

FIRST EMBODIMENT

A first embodiment will now be described with reference to FIGS. 1 to 2*b*.

According to this first embodiment, at least one distribution flap 19 is arranged inside an associated nebulizing pipe 9, so as to move between:

- at least one closed position (see FIG. 2*a*) blocking the first air flow F1; and
- a plurality of positions, called open positions (an open position is shown in FIG. 2*b*), allowing adjustment of the flow rate of the air flow F1 laden with droplets of nebulized liquid intended for a respective associated air outlet 7.

In particular, at least as many distribution flaps 19 are provided as there are distinct air outlets 7. More specifically, according to this first embodiment, at least one distribution flap 19 is arranged in each nebulizing pipe 9 associated with an air outlet 7. The distribution flaps 19 are respectively configured to independently regulate the flow rate of the air flow F1 laden with droplets of nebulized liquid for each nebulizing pipe 9.

Furthermore, according to this first embodiment, the air cooling device 1 comprises a sealed separation partition 21 arranged between two second pipes 15 surrounding a first associated nebulizing pipe 9. In this case, a distribution flap 19 can be arranged in each first pipe 9 that is located on each side of the separation partition 21.

Advantageously, each distribution flap 19 is arranged in part of the associated first pipe 9 that overhangs the reserve 3, with reference to the arrangement of the elements as schematically shown in FIGS. 1 to 2*b*.

According to this first embodiment, as previously stated, the position of each distribution flap 19 can be managed manually and/or automatically. Thus, for a given air outlet 7, the flow rate of the nebulizing flow F1 can be managed independently relative to the other air outlets 7, using the associated distribution flap 19.

According to this first embodiment, management of the nebulizing flow F1 for this air outlet 7 does not affect the nebulizing flows associated with the other air outlets 7 in aeraulic communication with the diffusers 8 arranged in another zone of the interior, for example, on the other side of the vehicle. Indeed, the movement of the distribution flap 19 associated with a given air outlet 7 does not necessarily affect the position of another distribution flap 19 associated with another air outlet 7. Of course, to this end the separation partition 21 is fully sealed.

SECOND EMBODIMENT

Figure 4C:
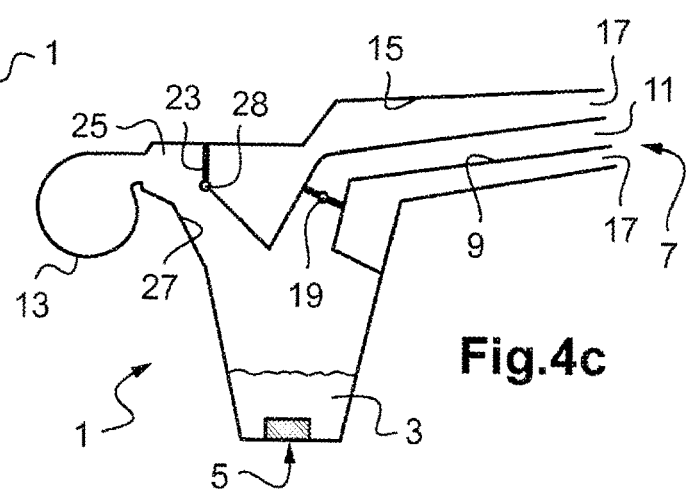
FIG. 4c is a third section view of the cooling device of FIG. 3 showing the distribution flap and the air distribution flap in closed positions blocking the passage of any air flow.

A second embodiment is shown in FIGS. 3 to 4*c*. The description of the first embodiment with reference to FIGS. 1 to 2*b* is applicable to the components which are the same. The differences between the first and second embodiments will now be described.

Unlike the first embodiment, in which the same amount of air flows in the first pipes 9 or in the second pipes 15 irrespective of the position of the distribution flap 19, the air cooling device 1 according to the second embodiment allows the amount of air circulating in the first 9 and second 15 pipes associated with a given zone in the interior to be regulated without affecting, or even elsewhere modifying or keeping constant, the amount of air circulating in the first 9 and second 15 pipes associated with another zone of the interior.

More specifically, according to this second embodiment, the cooling device 1 is configured to distribute, in a different manner for each air outlet 7, and thus for each diffuser 8 (not shown in FIGS. 3 to 4*c*), the air flow rate of the first air flow F1 intended to circulate in the first associated pipe 9 and of the second air flow F2 intended to circulate in the second associated pipe 15.

To this end, according to the second embodiment, the cooling device 1 comprises at least one air distribution flap 23 allowing separation of the air flow set into motion by the common propulsion component 13.

The one or more air distribution flap(s) 23 in this case is/are arranged upstream of the nebulizing device 5 in the flow direction of the first air flow F1. The distribution between the first air flow F1 and the second air flow F2 thus occurs before nebulization, i.e. before the first air flow F1 is laden with droplets of nebulized liquid.

In particular, at least as many air distribution flaps 23 are provided as there are distinct air outlets 7. According to the second embodiment, the cooling device 1 comprises at least two air distribution flaps 23 arranged on either side of the separation partition 21. Each air distribution flap 23 in this case is associated with a respective air outlet 7, and thus with a specific diffuser 8 (not shown in FIGS. 3 to 4*c*) opening into the interior.

More specifically, each air distribution flap 23 is arranged so as to distribute, for an associated air outlet 7, the air flow rate between the first air flow F1 intended to circulate in the first pipe 9 and the second air flow F2 intended to circulate in the second pipe 15.

In general, the first air flow F1 has a lower air flow rate than the second air flow F2. By way of a non-limiting example, the air flow rate of the first air flow F1 can be approximately 4 kg/h. The air flow rate of the second air flow F2 is, for example, approximately 30 to 65 kg/h, preferably approximately 40 kg/h. According to one embodiment, there is a ratio of approximately 6 to 10, preferably of approximately 8, between the air flow rates of the second F2 and of the first F1 air flow. By way of a non-limiting example, the flow speed of the second air flow F2 can be between 7 m/s and 10 m/s, and is preferably approximately 7 m/s.

The one or more air distribution flap(s) 23 can be of any type that allow two air flows to be separated, for example, such as a flag flap, a drum flap or even a butterfly flap.

In the example shown, the two air distribution flaps 23 are movably arranged. More specifically, each air distribution flap 23 can assume various positions allowing the first F1 or the second F2 air flow to be at least partially blocked. In other words, each air distribution flap 23 can move between two end positions, a first end position (shown in FIG. 4*a*) blocking the first air flow F1 and a second end position (shown in FIG. 4*c*), in which the air distribution flap 23 is able to block the second air flow F2, while passing through at least one intermediate open position, as shown in FIG. 4*b*.

Advantageously, the air cooling device 1 also comprises at least one distribution flap 19 movably arranged inside an associated nebulizing pipe 9, as described with reference to the first embodiment.

The selection of the position of the air distribution flap 23 and of the distribution flap 19 allows both:

management of the volume of air to be distributed between the second air flow F2 and the first air flow F1; and once this distribution is complete, management of the flow rate of the first air flow F1 when it is laden with droplets of nebulized liquid, called nebulizing flow.

According to the example shown in FIG. 4*a*, for a given air outlet 7, the distribution flap 19 is in the closed position of the nebulizing pipe 9 when the air distribution flap 23 is in the first position blocking the first air flow F1. In this first end position shown in FIG. 4*a*, only the second air flow F2 is distributed inside the interior, such that no droplets of nebulized liquid are discharged through the air outlet 7.

With reference to FIG. 4*b*, the air distribution flap 23 and the distribution flap 19 associated with a given air outlet 7 both can be arranged in an intermediate position allowing, on the one hand, distribution of the air flow rate for the first air flow F1 intended to circulate in the first pipe 9 and the second air flow F2 intended to circulate in the second pipe 15 and, on the other hand, regulation of the flow rate of the first air flow F1 laden with droplets of nebulized liquid.

Finally, for a given air outlet 7, an air distribution flap 23 in practice is arranged in the second end position completely blocking the second air flow F2 when the first air flow F1 is also blocked by the arrangement of the distribution flap 19 in the closed position (see FIG. 4*c*). In this case, no air is diffused toward the interior through the diffuser 8 (not shown in FIG. 4*c*) associated with this air outlet 7.

Furthermore, the cooling device 1 can comprise an air feed canal 25 connected to the common propulsion member 13. According to the example shown in FIGS. 3 to 4*c*, this air feed canal 25 is in aeraulic communication with the first pipes 9 and the second pipes 15. More specifically, in this example, the air feed canal 25 opens, on the one hand, onto the second pipes 15 and, on the other hand, onto routing canals 27 each opening onto a first associated pipe 9. Each routing canal 27 therefore is arranged so as to place the air feed canal 25 and a first associated pipe 9 in aeraulic communication.

The sealed separation partition 21 begins, in the example shown, at the junction between the air feed canal 25, the routing canals 27 and the second pipes 15, so as to separate the air flows intended for each air outlet 7.

Each air distribution flap 23 is then arranged in order to be:
- arranged between the air feed canal 25 and a routing canal 27 in the first end position shown in FIG. 4a; and to be
- arranged between the air feed canal 25 and a second pipe 15 in the second end position shown in FIG. 4c.

The air distribution flaps 23 are, in the example shown in FIGS. 3 to 4c, respectively hinged about a pivot axis 28. The pivot axis 28 in this case is arranged at the junction between:
- the feed canal 25; and
- a routing canal 27 and a second pipe 15, said latter two elements being associated with a given air outlet 7.

In particular, the position of the flaps 19 and 23 is determined as a function of the air flow rate and of the flow rate of nebulized liquid requested by the user.

The one or more flap(s) 19 and/or 23 can be moved manually under the action of a user and/or at least partially automatically using at least one actuator (not shown). As previously described, at least one device (not shown) for controlling the actuator can be provided that comprises at least one processing means for determining the arrangement of the flaps 19 and 23 as a function of thermal and/or climate conditions.

Managing the positioning of the flaps 19 and/or 23 is worthwhile, particularly in order to have a different distribution in the right-hand or left-hand side of the interior of the vehicle, as a function of factors influencing the thermal comfort of the occupants, such as, for example, direct exposure to the sun on only one side of the interior.

By way of a non-limiting example, if only the occupants in one zone of the interior, for example, on the right-hand or on the left-hand side, experience an event that increases their thermal discomfort, for example, they are exposed to a solar flux, in this case, with respect to the one or more diffuser(s) 8 arranged on this side in particular, the distribution between the first air flow F1 and the second air flow F2 can be independently managed using the air distribution flaps 23. By way of a variation or in addition, the flow rate of the nebulizing flow F1 can be independently managed for each diffuser 8 using distribution flaps 19. Of course, this management does not affect the management of the air flows F1, F2 for the other diffusers 8 arranged in another zone of the interior, for example, on the other side of the vehicle.

In this case, at least one processing means can, for a given air outlet 7:

determine, as a result of this sunlight, that the distribution between the first air flow F1 and the second air flow F2 must be modified and/or that the flow rate of the air flow F1 laden with droplets of nebulized liquid must be modified; and consequently, determine the position that is to be adopted by the air distribution flap 23 and/or by the distribution flap 19; and control the actuator so that it moves the air distribution flap 23 and/or the distribution flap 19 to the determined position.

According to this second embodiment, the movement of the air distribution flap 23 does not necessarily affect the position of another air distribution flap 23 associated with another air outlet 7 associated with a diffuser 8 arranged in another part or zone of the interior that is not exposed to the sun, for example. Similarly, the movement of the distribution flap 19 does not necessarily affect the position of another distribution flap 19 associated with another air outlet 7.

Finally, according to this second embodiment, the air distribution flap 23 and the distribution flap 19 associated with an air outlet 7, and thus with a zone of the interior, can be driven in a joint manner according to kinematics, not described hereafter, linking the two flaps or, by way of a variation, in a separate and independent manner.

THIRD EMBODIMENT

A third embodiment is shown in FIG. 5. The description of the first and second embodiments with reference to FIGS. 1 to 4*c* is applicable to the components which are the same. The differences in the third embodiment compared to the previously described embodiments will now be described.

According to the example shown in FIG. 5, the air cooling device 1 comprises two first pipes 91 and 92, respectively associated with a second pipe 151, 152. In this third embodiment, the configuration of the air cooling device 1 particularly differs from the other embodiments by the fact that it comprises an air flow feed canal 125 having:

a first branch 127 that divides to form the two first pipes 91 and 92; and a second branch 129 that divides to form the two second pipes 151 and 152.

Furthermore, in this third embodiment, a single distribution flap 119 allows the flow rate of the first air flow F1 laden with droplets of nebulized liquid to be regulated in at least two first pipes 91, 92. To this end, at least one distribution flap 119, and in the example shown a single distribution flap 119, is arranged at the junction of the two nebulizing pipes 91 and 92. Unlike the first and second embodiments, in which at least one distribution flap 19 is provided for each nebulizing pipe 9, in this third embodiment it is the same distribution flap 119 that manages the first air flow F1 for two nebulizing pipes 91 and 92 and which is therefore intended for two distinct air outlets 7. In other words, the distribution flap 119 is arranged so as to distribute the first air flow F1 circulating in the first branch 127 between the two first pipes 91 and 92 respectively associated with a specific air outlet 7.

This distribution flap 119 is movably arranged between two end positions for closure of either one of the nebulizing pipes 91, 92. In other words, in a first end position, the distribution flap 119 blocks the passage of the first air flow F1 in the nebulizing pipe 91 and allows the passage of the first air flow F1 in the other nebulizing pipe 92. Conversely, in its second end position, the distribution flap 119 blocks the passage of the first air flow F1 in the nebulizing pipe 92 for which access was previously allowed, and allows the passage of the first air flow F1 in the nebulizing pipe 91 for which access was previously blocked.

Of course, the distribution flap 119 can assume various intermediate positions between these two end positions. In FIG. 5, the distribution flap 119 is schematically shown in an intermediate position. The distribution flap 119 thus can distribute the first air flow F1 laden with droplets of nebulized liquid intended for each air outlet 7 associated with a nebulizing pipe 91, 92.

In a similar manner to the other embodiments, according to this third embodiment, the first F1 and second F2 air flows are advantageously set into motion by a common air propulsion component 13, as previously described. The air feed canal 125 in this case is connected to the common air propulsion component 13. An air distribution flap 123 is then provided that allows the first air flow F1 and the second air flow F2 to be distributed. In particular, the air distribution flap 123 is arranged between the first branch 127 and the second branch 129 of the air feed canal 125. This arrangement allows the air distribution flap 123 to separate the air flow originating from the common air propulsion component 13 between:
- a first air flow F1 intended for the first branch 127 that will be subsequently separated again in order to circulate in the nebulizing pipes 91 and 92; and
- a second air flow F2 intended for the second branch 129 that will be subsequently separated again in order to circulate in the second pipes 151 and 152.

Unlike the second embodiment that provides a distinct air distribution flap 23 for each air outlet 7, in this third embodiment it is the same distribution flap 123 that manages the distribution between the first air flow F1 intended for the first pipes 91 and 92 via the first branch 127 and the second air flow F2 intended for the second pipes 151 and 152 via the second branch 129.

Finally, in this third embodiment, an additional air distribution flap 131 can be arranged in order to distribute the second air flow F2 circulating in the second branch 129 between the second pipes 151 and 152 respectively associated with a specific air outlet 7.

To this end, the additional air distribution flap 131 is movably arranged at the junction between the two second pipes 151 and 152 between two end positions for closure of either one of the two pipes 151, 152. In other words, in a first end position, the additional air distribution flap 131 blocks the passage of the second air flow F2 in the second pipe 151 and allows the passage of the second air flow F2 in the other second pipe 152. Conversely, in its second end position, the additional air distribution flap 131 blocks the passage of the second air flow F2 in the second pipe 152 for which access was previously allowed, and allows the passage of the second air flow F2 in the second pipe 151 for which access was previously blocked.

Of course, the additional air distribution flap 131 can assume various intermediate positions between these two end positions. In FIG. 5, the additional air distribution flap 131 is schematically shown in an intermediate position. The additional air distribution flap 131 thus can distribute the second air flow F2 intended for each air outlet 7 associated with a second pipe 151, 152.

Thus, by arranging a distribution flap 19 in each nebulizing pipe 9 according to the first and second embodiment to manage the nebulizing flow for each zone of the interior, or by arranging a single distribution flap 119 to manage the nebulizing flow in two zones of the interior, as described with reference to the third embodiment, the amount of nebulized liquid can be regulated for each zone of the interior either as a function of a command by the user or automatically, or even with control that is both manual and automatic.

By adding at least one further flap, in this case an air distribution flap 23; 123, optionally combined with the action of a distribution flap 131 for the second air flow F2, this also allows the volume of air circulating in the first 9; 91, 92 and second 15; 151, 152 pipes to be adapted for each zone of the interior.

The invention claimed is:

1. An air cooling device for a motor vehicle, comprising:
   at least one liquid reserve;
   at least one nebulizing device for nebulizing liquid droplets;
   at least two air outlets respectively configured for diffusing at least one air flow for an interior of the motor vehicle, wherein at least one air flow from the at least two air outlets mix with the liquid droplets;
   at least two nebulizing pipes traversed by an air flow of the at least one air flow laden with the liquid droplets nebulized by the at least one nebulizing device, each nebulizing pipe being arranged in fluidic communication with the at least one liquid reserve and with a corresponding air outlet of the at least two air outlets; and
   at least one nebulizing regulating member configured to regulate a flow rate of the air flow laden with the liquid droplets nebulized by the at least one nebulizing device that traverses one of the at least two nebulizing pipes and to be diffused through the corresponding air outlet of the one of the at least two nebulizing pipes,
   wherein the at least one nebulizing regulating member is produced in a form of a distribution flap, and
   wherein the distribution flap is arranged at a junction of the at least two nebulizing pipes, so as to move between two end positions for closure of either one of the at least two nebulizing pipes, so as to distribute the air flow laden with the liquid droplets nebulized by the at least one nebulizing device for each of the corresponding air outlets of the at least two nebulizing pipes.

2. The air cooling device as claimed in claim 1, comprising:
   at least two first pipes forming the at least two nebulizing pipes intended to be traversed by a first air flow; and
   at least two second pipes respectively traversed by a second air flow distinct from the first air flow; and
   wherein each second pipe is associated with a corresponding first pipe of the at least two first pipes and is arranged in fluidic communication with the corresponding air outlet.

3. The air cooling device as claimed in claim 2, wherein each first pipe is at least partially disposed inside a corresponding second pipe of the at least two second pipes.

4. The air cooling device as claimed in claim 3, comprising:
   a sealed separation partition arranged between the at least two second pipes; and
   at least two air distribution flaps arranged on either side of the sealed separation partition, respectively configured to distribute, for the corresponding air outlet, the first air flow and the second air flow that circulate in the first pipe and in the second pipe associated with the corresponding air outlet.

5. The air cooling device as claimed in claim 2, wherein the first air flow and the second air flow are set into motion by a air propulsion component of the air cooling device or of a heating, ventilation and/or air conditioning installation configured to equip the motor vehicle.

6. The air cooling device as claimed in claim 5, comprising at least one air distribution flap movably arranged so as to distribute an air flow rate between the first air flow and the second air flow.

7. The air cooling device as claimed in claim 6, comprising an air flow feed canal, the air flow feed canal having:
   a first branch dividing into the at least two first pipes; and
   a second branch dividing into the at least two second pipes.

8. The air cooling device as claimed in claim 7, wherein one of the at least two air distribution flaps is arranged between the first branch and the second branch of the air flow feed canal, so as to distribute the first air flow for the at least two first pipes via the first branch and the second air flow for the at least two second pipes via the second branch.

9. The air cooling device as claimed in claim 7, comprising an additional air distribution flap movably arranged at a junction between the at least two second pipes between two end positions for closure of either one of the at least two second pipes, so as to distribute the second air flow circulating in the second branch between the at least two second pipes respectively associated with a distinct air outlet.

10. A heating, ventilation and/or air conditioning installation comprising the air cooling device as claimed in claim 1.

\* \* \* \* \*